Figure 1:
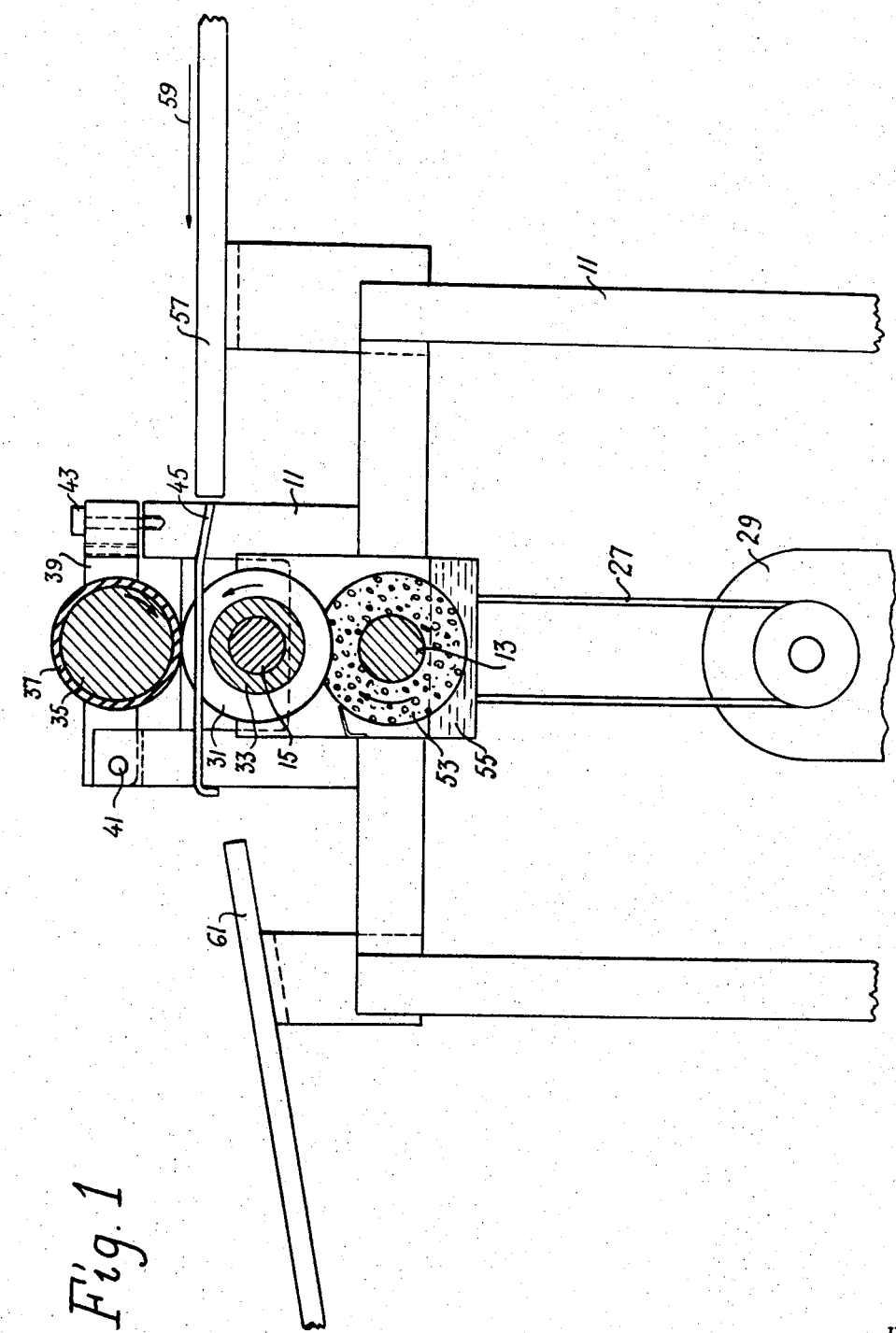

United States Patent

[11] 3,543,623

| [72] | Inventor | Roland Torsten Wirstroem<br>Orebro, Sweden |
|---|---|---|
| [21] | Appl. No. | 811,722 |
| [22] | Filed | April 1, 1969 |
| [45] | Patented | Dec. 1, 1970 |
| [73] | Assignee | Orbo Aktiebolag<br>Orebro, Sweden<br>a company of Sweden |
| [32] | Priority | April 2, 1968 |
| [33] | | Sweden |
| [31] | | No. 4346/68 |

[54] MACHINE FOR CUTTING STRIPS
3 Claims, 2 Drawing Figs.

[52] U.S. Cl............................................. 83/169,
83/493, 83/505, 83/922
[51] Int. Cl............................................. B26d 7/08,
B26d 1/22
[50] Field of Search............................................. 83/169,
347, 493, 505, 506, 922

[56] References Cited
UNITED STATES PATENTS

| 3,782 | 10/1844 | Tyer et al...................... | 83/493X |
| 567,164 | 9/1896 | Pope.............................. | 83/493X |
| 1,302,414 | 4/1919 | Nerness......................... | 83/169X |
| 1,597,800 | 8/1926 | Johnstone ..................... | 83/506X |
| 1,779,916 | 10/1930 | Paup.............................. | 83/169 |
| 2,796,933 | 6/1957 | Gelleke ......................... | 83/506 |

Primary Examiner—William S. Lawson
Attorney—Cushman, Darby and Cushman

ABSTRACT: A machine for cutting sticky sheet material into parallel strips comprises a series of cutting blades assembled in spaced relation upon a rotary shaft. The sheet material is fed between said blades and an upper hard rubber roller, into the surface of which the circular edges of the blades cut in slightly. The blades are driven with a higher peripheral speed than said roller. Guide tongues extending between the blades divert the cut strips horizontally out of the cutting zone. The blade edges are lubricated by means of a lower foam rubber roller.

MACHINE FOR CUTTING STRIPS

The present invention relates to a machine for cutting sheet material stripwise, more specially sheet material containing a sticky substance, for example in the form of a coating or an intermediate layer. Primarily the invention relates to the cutting out of sealing strips or ribbons such as are provided on one side with a self-adhesive coating covered with a protective layer intended to be stripped off prior to the use of the sealing strip, in order to expose the sticky face thereof.

The presence of such a sticky substance causes great difficulties when sheets of the material in question are to be cut up into strips, since said substance oozes out and tends to be transferred to the cutting tools so that the material sticks thereto and the cutting operation is interfered with. This often causes damage to the material.

The object of the present invention is to overcome this difficulty.

The invention accordingly provides a machine for cutting sheet material stripwise, comprising a plurality of cutting disks fixed in spaced relation upon a rotary shaft, a rotary roller arranged with its axis substantially parallel to said shaft and having a resilient surface for engagement with the cutting edges of the disks, guide means extending between said cutting disks, and means for applying lubricant to the cutting edges of said disks, the said shaft and roller being capable of being driven at relative speeds such that the peripheral speed of said disks is substantially greater than that of the roller, and the arrangement being such that sheet material to be cut can be fed between the guide means and the roller for transport by the latter during cutting of the sheet by said disks, the cutting edges of the disks partially penetrating the surface of the roller and the guide means serving to guide the severed strips away from said disks.

Figure 2:
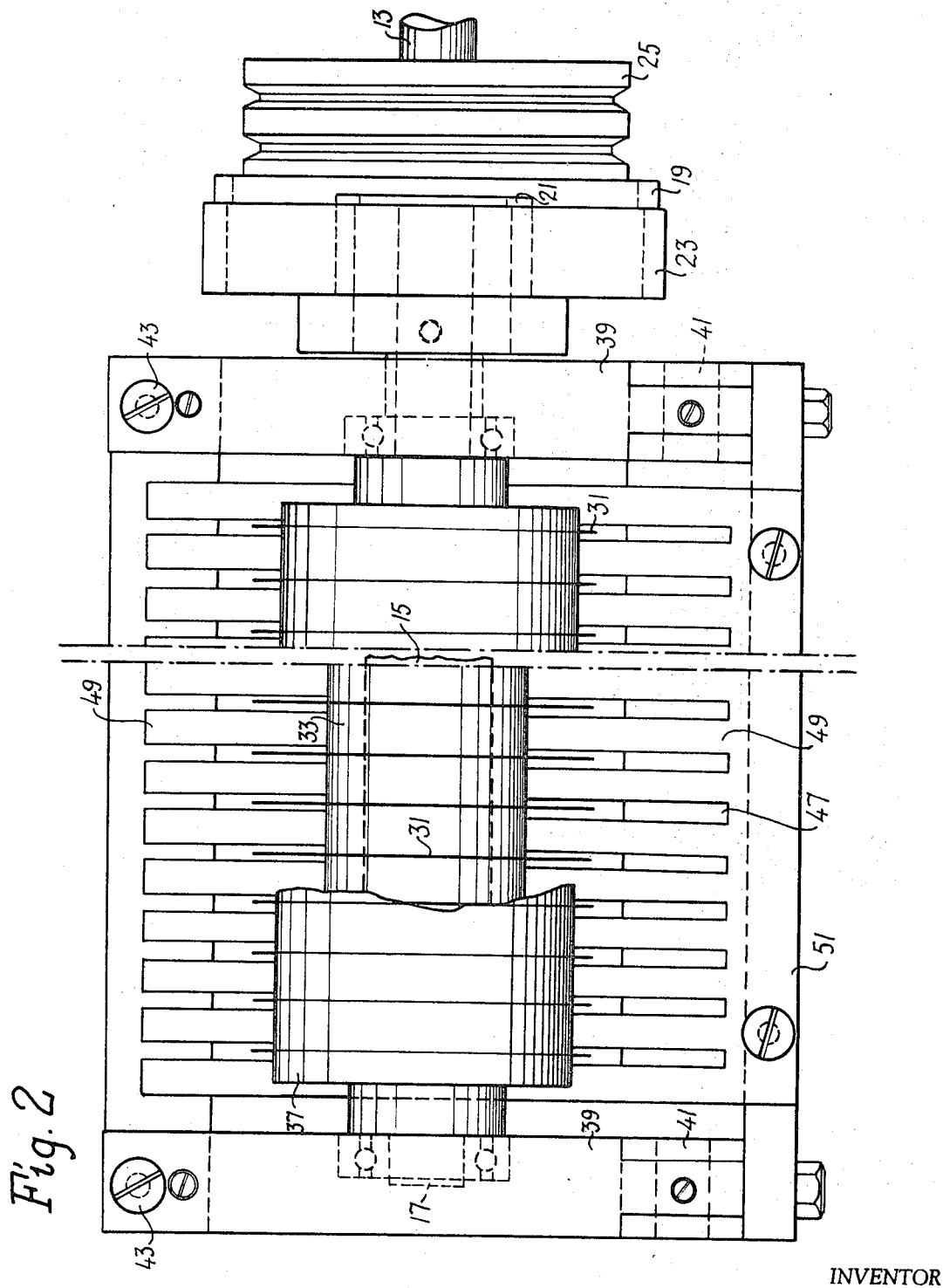

The invention is illustrated, by way of example, in the accompanying drawings, in which:

FIG. 1 is a side elevation of a machine according to the invention, partly in section, and FIG. 2 is an enlarged plan view corresponding to FIG. 1, with parts broken away.

Referring to the drawings, the machine comprises a framework 11 serving to support bearings at the ends of three horizontal shafts 13, 15, 17 located in the same vertical plane. Attached to one end of each of said shafts are gear wheel 19, 21, 23 respectively, which mesh with one another. The gear wheel 19 is integral with a belt pulley 25 which is coupled by means of a V-belt to a geared motor 29 supported below said shafts by the framework 11. When the motor is switched on, all shafts are driven, the shaft 15 rotating at a considerably greater speed than the other two shafts since the gear wheel 21 has a diameter approximately one-third of the diameter of the gear wheels 19 and 23.

A number of equally spaced disk shaped blades 31 are held upon the shaft 15 between spacing sleeves 33, being clamped between end supporting rings. The blades are made of steel plate of 0.4 millimeters in thickness and have a sharply ground circular edge. The free periphery of each blade extends beyond the spacing sleeves by a distance greater than the thickness of the material which it is desired to cut up into strips but is of the same order as said thickness, preferably about 10 to 30 mm.

The upper shaft 17 supports or forms a solid roller 35 having a relatively thick rubber outer layer 37. The ends of the shaft 17 are journaled in a bracket 39 which is pivoted for upward movement about pins 41 and can be clamped to the framework 11 by means of attachment screws 43 enabling a small adjustment of the roller 35, 37 in the vertical direction whilst maintaining the mesh of the gear wheels 23 and 21. Normally the rubber roller is so adjusted that the edges of the blades 31 penetrate slits in the face of the rubber lining by about 2 millimeters. Preferably said slits are formed by the blades 31 cutting into the rubber lining. Owing to the resilience of the rubber, the slits are normally closed and are opened only when the blades 31 penetrate them. Since the rubber roller can be swung upwards, it is easy to exchange the shaft 15 and associated blades 31 when the width of the strips to be cut is to be altered.

A guide means consisting of an essentially flat thin plate 45 of spring steel and having a thickness of about 2 millimeters is arranged between the shaft 15 and the rubber roller and has a plurality of parallel slots 47 through which the blades 31 project. Between said slots are residual parallel tongues 49 integral with a margin 51 which is attached to a horizontal supporting rail of the framework of the machine by screws. The free ends of the tongues 49 rest against a horizontal supporting rail on the opposite side of blades 31, to which rail they may be fastened. When the blades 31 are spaced apart 9 millimeters, for example, the tongues preferably have a width of 7 millimeters, so that they will be separated by slots having a width of 2 millimeters.

The lower shaft 13 supports a roller 53 consisting of foam rubber or similar porous material. The roller 53 serves to apply to the blades 31 a lubricant, e.g. silicon oil, from a reservoir 55, into which the roller 53 extends. The blades 31 penetrate the foam rubber roller 53 and thus the opposite sides thereof adjacent the cutting edge are coated with lubricant.

The material is to be cut into strips comprises a porous and resilient sheet having a thickness of several millimeters, preferably composed of foam rubber or foamed plastics material such as polyether foam, one side of which is united by means of a permanent cemented joint to a surface layer provided with a self-adhesive coating which is protected by a cover foil intended to be stripped off immediately before the application of the composite strip, for instance as a sealing strip for a window frame. The opposite side of the porous sheet may have a cloth covering attached by superficially melting the material of the sheet. Owing to the self-adhesive coating which is sticky and tends to adhere to the cutting tool, great difficulties have hitherto been encountered in the cutting of such sheets and it has only been possible hitherto to cut one strip at a time, usually with the aid of a razor blade drawn along a fixed ruler.

When using the above described machine, one sheet at a time is placed upon a feed table 57 at one side of the machine and is fed by hand in the direction of the arrow 59, so that its leading edge runs over the guide plate 45 and is grasped in the nip between the blades 31 and the rubber roller 35, 37, the edges of the blades urging the sheet against the rubber surface 37. The cutting blades 31 are driven at a peripheral speed which is greater than that of the rubber roller, preferably by 1.5 to 3 times so that the cutting edges do not merely shear but rather saw themselves through the sheet, i.e. at the point where cutting takes place the blades 31 move relatively to the sheet both in the direction of the thickness of the latter and also, at a greater rate, in the feed direction of the sheet. A working surface for the blades 31 is formed by the cylindrical surface of the rubber roller 37 located on opposite sides of and adjacent the slits into which the edges of the blades 31 penetrate. The sheet is fed by the combined driving action of the blades 31 and the rubber roller 37, the speed of the sheet being determined almost exclusively by the peripheral speed of the rubber roller 37 owing to the high coefficient of friction of the surface of the latter and the fact that the lubricated cutting blades 31 have a very insignificant driving action. Upon cutting of the sheet the adhesive layer therein becomes exposed at the cut faces thereof and has a tendency to stick to the blades 31. However, this is counteracted owing to the lubrication of the blades 31 by means of the roller 53, which also has a cleaning effect upon the blades.

The strips formed as a result of the above described cutting operation are compressed sidewise between the blades 31 and thus make resilient engagement with the opposite surfaces of the latter. In spite of the reduction or elimination of adhesion due to the self-adhesive coating, the discharged strips will nevertheless tend to accompany the blades 31 in their rotary motion until they engage the tongues 49 and are thereby guided away from the blades 31 in a direction which is horizontal and tangential to the blades. In the absence of the tongues 49, the strips would wind themselves around the shaft 15. The strips are advanced merely by being pushed from the rear which requires a certain stiffness thereof and also a reasonably high feed velocity so that their inertia will be of importance. The strips rest first upon the tongues 49 and then upon a receiving table 61 alined therewith or located at a somewhat lower level and preferably slightly inclined. A speed of transport of 2 to 3 meters per second has proved to afford a proper feed of the strips without the requirement of any additional driving means on the discharging side.

The machine described above may be used for cutting material in the form of a continuous web and also for cutting material other than that mentioned above, e.g. paper or board material which is difficult to cut up in strips when provided with a sticky coating.

I claim:

1. A machine for cutting sheet material stripwise, comprising a plurality of cutting disks fixed in spaced relation upon a rotary shaft, a rotary roller arranged with its axis substantially parallel to said shaft and having a resilient surface for engagement with the cutting edges of the disks, guide means extending between said cutting disks, and means for applying lubricant to the cutting edges of said disks, the said shaft and roller being capable of being driven at relative speed such that the peripheral speed of said disks is substantially greater than that of the roller, and the arrangement being such that sheet material to be cut can be fed between the guide means and the roller for transport by the latter during cutting of the sheet by said disks, the cutting edges of the disks partially penetrating the surface of the roller and the guide means serving to guide the severed strips away from said disks.

2. A machine as claimed in claim 1, in which the guide means comprise a substantially flat plate provided with a plurality of spaced parallel slots through which the said disks project.

3. A machine as claimed in claim 1, in which the lubricating means comprises a further roller arranged with its axis substantially parallel to said shaft and comprising a body of liquid permeable material, the cutting edges of said disks being arranged to penetrate the material of the roller, and the latter being arranged to extend into a reservoir for lubricant.